US008316553B2

(12) United States Patent
Matsumiya et al.

(10) Patent No.: US 8,316,553 B2
(45) Date of Patent: Nov. 27, 2012

(54) COORDINATE MEASURING MACHINE

(75) Inventors: Sadayuki Matsumiya, Kawasaki (JP); Hidemitsu Asano, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 222 days.

(21) Appl. No.: 12/765,401

(22) Filed: Apr. 22, 2010

(65) Prior Publication Data

US 2010/0269361 A1    Oct. 28, 2010

(30) Foreign Application Priority Data

Apr. 23, 2009 (JP) ................................. 2009-105205

(51) Int. Cl.
*G01B 5/008* (2006.01)
*G01B 21/20* (2006.01)

(52) U.S. Cl. .............................. 33/503; 33/556; 33/1 M

(58) Field of Classification Search .................... 33/503, 33/556, 557, 558, 1 M; 702/152, 153, 168
See application file for complete search history.

(56) References Cited

U.S. PATENT DOCUMENTS

| | | | | |
|---|---|---|---|---|
| 4,612,709 A | * | 9/1986 | Baisch et al. | 33/707 |
| 5,148,600 A | * | 9/1992 | Chen et al. | 33/1 M |
| 6,396,589 B1 | * | 5/2002 | Ebihara | 356/601 |
| 6,901,677 B2 | * | 6/2005 | Smith et al. | 33/551 |
| 7,647,706 B2 | * | 1/2010 | Jordil et al. | 33/503 |
| 2007/0266781 A1 | * | 11/2007 | Nemoto et al. | 73/105 |
| 2009/0073419 A1 | * | 3/2009 | Gesner et al. | 356/73 |
| 2009/0172962 A1 | * | 7/2009 | Aubele et al. | 33/556 |
| 2010/0000307 A1 | * | 1/2010 | Igasaki et al. | 73/105 |

FOREIGN PATENT DOCUMENTS

| | | |
|---|---|---|
| EP | 0240151 A | 10/1987 |
| EP | 1983297 A1 | 10/2008 |
| JP | 2008-089578 | 4/2008 |

OTHER PUBLICATIONS

H.N. Hansen, N. Kofod, L. Dechiffre and T. Wanhelm, "Calibration and Industrial Application of Instrument for Surface Mapping Based on AFM", CIRP Annals, Elsevier BV, NL, CH, FR LNKD-D01:10. 1016/S0007-8506(07) 61563-7, vol. 51, No. 1, pp. 471-474, XP022136861.

* cited by examiner

*Primary Examiner* — Richard A Smith
(74) *Attorney, Agent, or Firm* — Rankin, Hill & Clark LLP

(57) ABSTRACT

A coordinate measuring machine has a coordinate measuring machine body and a controller. The coordinate measuring machine body has a probe having a measurement piece and a drive mechanism for driving the probe. The probe has a drive unit for driving the measurement piece. The controller includes a first measuring unit and a second measuring unit. The first measuring unit measures a displacement of the measurement piece driven by the drive unit. The second measuring unit measures a displacement of the probe. The measurement accuracy of the second measuring unit is lower than the measurement accuracy of the first measuring unit.

1 Claim, 3 Drawing Sheets

US 8,316,553 B2

COORDINATE MEASURING MACHINE

The entire disclosure of Japanese Patent Application No. 2009-105205, filed Apr. 23 2009, is expressly incorporated by reference herein.

BACKGROUND OF THE INVENTION

1. Field of the Invention

The present invention relates to a coordinate measuring machine.

2. Description of Related Art

A typically known coordinate measuring machine includes: a probe having a measurement piece that moves within a predetermined range while being in contact with an object to be measured: and a drive mechanism that supports and drives the probe, where the object is measured based on the displacements of the measurement piece and the probe (see, for instance, Literature 1: JP-A-2008-89578).

A surface-profile measuring instrument (coordinate measuring machine) disclosed in Literature 1 includes: a scanning probe having a measurement piece; and a drive mechanism. The surface-profile measuring instrument acquires the displacements of the measurement piece and the probe while the measurement piece is pushed against an object, the acquired displacements being combined to measure the object.

Since such a coordinate measuring machine employs a drive mechanism for moving the measurement piece to measure an object, it is required that the coordinate measuring machine has a measurement space of a volume larger than the object in order to measure the object. Accordingly, when a large-size object such as a vehicle component is to be measured, a large-size coordinate measuring machine has to be used.

When a large object on which a plurality of small holes are consecutively formed at predetermined intervals is measured by a coordinate measuring machine, it sometimes occurs that the diameter of each of the holes has to be precisely measured but the pitches between the holes do not have to be measured with a high accuracy. In other words, there sometimes is a mixture of a small area and a large area on an object, the small area requiring highly accurate measurement, the large area requiring not so much accurate measurement.

However, according to the coordinate measuring machine disclosed in Literature 1, the large area has to be measured with an expensive coordinate measuring machine having a measurement accuracy corresponding to the small area that has to be highly accurately measured.

Further, since a large-size coordinate measuring machine requires a large drive mechanism, it is difficult to measure the small area at a high speed.

SUMMARY OF THE INVENTION

An object of the invention is to provide an inexpensive coordinate measuring instrument that is adapted to appropriately measure a large object having a mixture thereon of a small area that requires highly accurate measurement and a large area that requires not so much accurate measurement.

A coordinate measuring machine according to an aspect of the invention includes: a probe with a measurement piece that is movable within a predetermined range; and a drive mechanism that supports and drives the probe, the coordinate measuring machine measuring an object based on a displacement of the measurement piece and a displacement of the probe, in which the probe includes a measurement-piece drive unit that drives the measurement piece; the coordinate measuring machine includes: a first measuring unit that measures the displacement of the measurement piece that is driven by the measurement-piece drive unit; and a second measuring unit that measures the displacement of the probe, and a measurement accuracy of the second measuring unit is lower than a measurement accuracy of the first measuring unit.

According to the above arrangement, the coordinate measuring machine is adapted to measure a small area by the measurement piece driven by the measurement-piece drive unit and measure a large area by the probe driven by the drive mechanism. Since the measurement accuracy of the second measuring unit for measuring the displacement of the probe is lower than the measurement accuracy of the first measuring unit for measuring the displacement of the measurement piece, a large object having thereon a mixture of small areas that have to be measured with high accuracy and large areas that require not so much of accuracy can be appropriately measured. Since only the improvement in measurement accuracy of the first measuring unit is required, the coordinate machine can be inexpensively manufactured.

Since the measurement-piece drive unit is provided on the probe driven by the drive mechanism, the size of the measurement-piece drive unit can be reduced as compared to the drive mechanism. Accordingly, a small area can be measured at a high speed.

DETAILED DESCRIPTION OF PREFERRED EMBODIMENT(S)

An exemplary embodiment of the invention will be described below with reference to the attached drawings.

Figure 1:
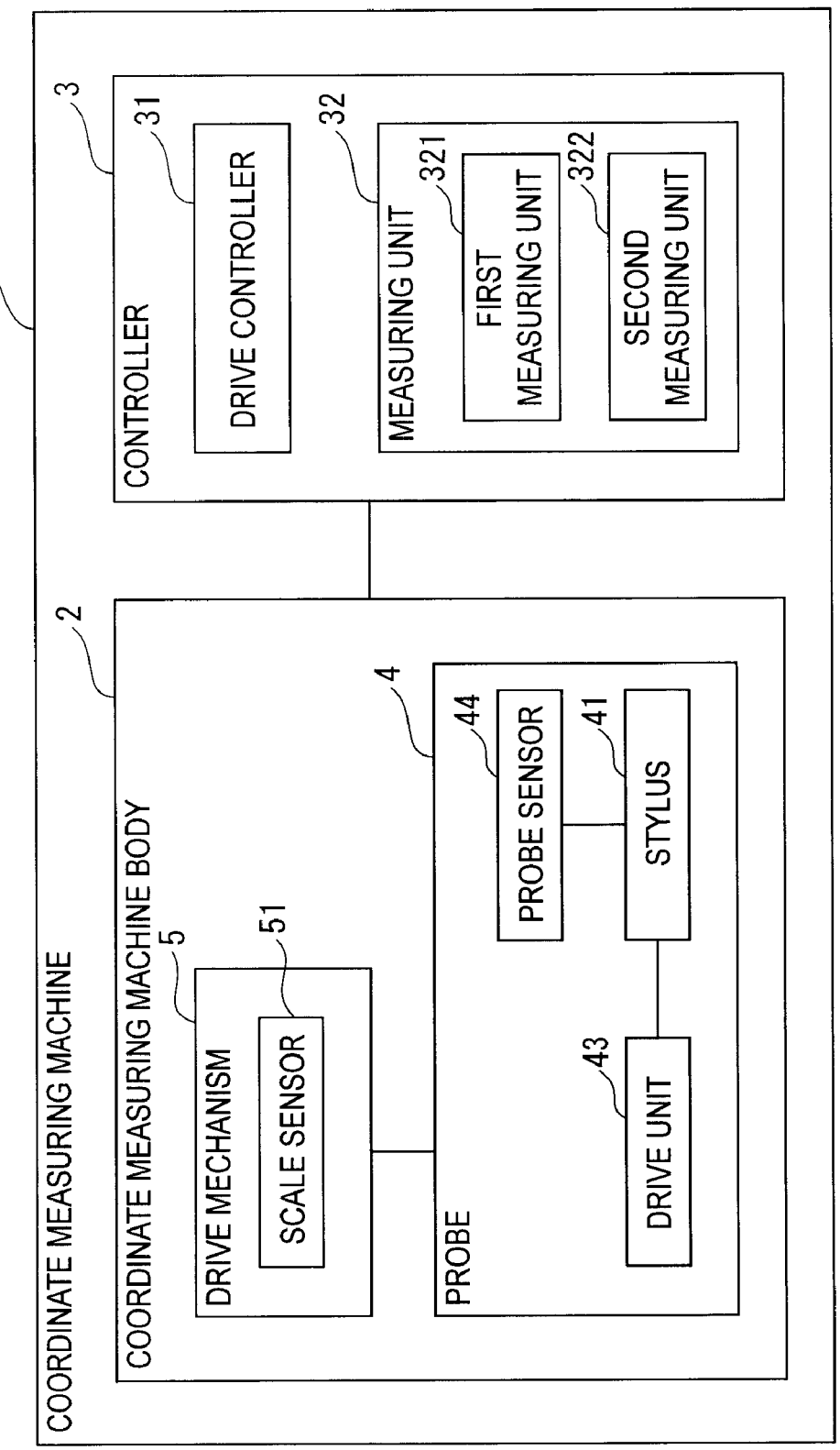
FIG. 1 is a block diagram showing a coordinate measuring machine according to an exemplary embodiment of the invention.

FIG. 1 is a block diagram showing a coordinate measuring machine 1 according to an exemplary embodiment of the invention.

As shown in FIG. 1, the coordinate measuring machine 1 includes a coordinate measuring machine body 2 and a controller 3 for controlling the coordinate measuring machine body 2.

Figure 2:
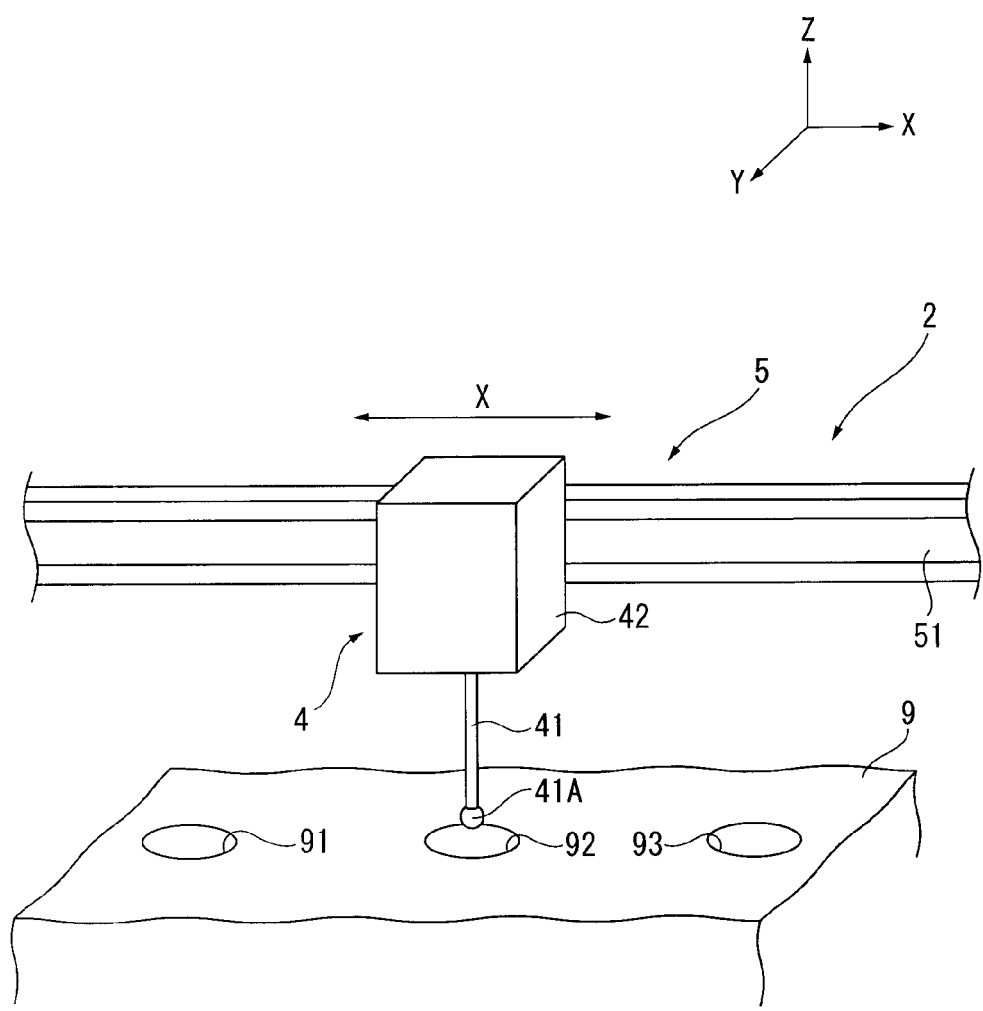
FIG. 2 is a schematic illustration showing a part of a coordinate measuring machine body according to the exemplary embodiment.

FIG. 2 is a schematic illustration showing a part of the coordinate measuring machine body 2. Incidentally, the upper direction in FIG. 2 will be represented as +Z-axis direction in FIG. 2 and two axes orthogonal to the Z-axis will be represented respectively as X-axis and Y-axis, which also applies in the rest of the drawing.

As shown in FIGS. 1 and 2, the coordinate measuring machine body 2 includes: a probe 4 having a spherical measurement piece 41A for measuring an object 9; and a drive mechanism 5 for supporting and driving the probe 4. In this exemplary embodiment, the object 9 is exemplified by a large member having a consecutive plurality of small holes 91, 92 and 93 at predetermined large intervals in X-axis direction.

Figure 3:
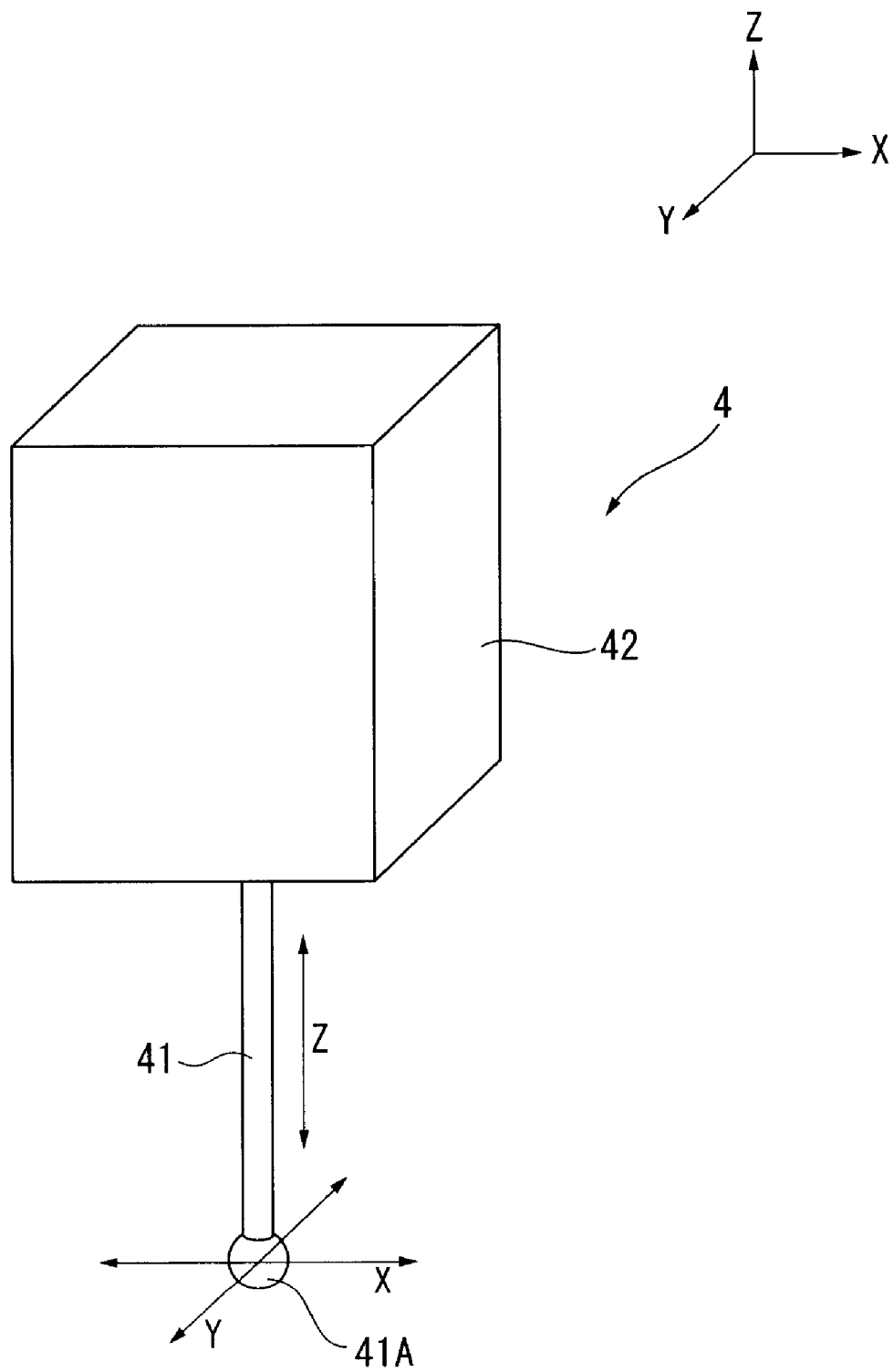
FIG. 3 is an enlarged schematic illustration showing a probe according to the exemplary embodiment.

FIG. 3 is an enlarged schematic illustration showing the probe 4.

As shown in FIG. 3, the probe 4 includes a stylus 41 having an axis in Z-axis direction, the stylus 41 having a measurement piece 41A at an end thereof (lower side in FIG. 3) and a support mechanism 42 for supporting a base end of the stylus 41.

As shown in FIGS. 1 and 3, the support mechanism 42 supports the stylus 41 so that the stylus 41 is movable in respective axis directions (X, Y and Z-axis directions, represented by arrows in FIG. 3) within a predetermined range. The support mechanism 42 has a drive unit 43 for driving the stylus 41 in the respective axis directions and a probe sensor 44 for detecting the displacement of the stylus 41 in the respective axis directions. The drive unit 43 serves as a measurement-piece drive unit for driving the measurement piece 41A by driving the stylus 41.

As shown in FIGS. 1 and 2, the drive mechanism 5 supports and drives the probe 4 so that the probe 4 is movable in X-axis direction (represented by a two-headed arrow in FIG. 2). The drive mechanism 5 has a scale sensor 51 for detecting the displacement of the probe 4 in X-axis direction.

As shown in FIG. 1, the controller 3 has a drive controller 31 for controlling the drive of the stylus 41 and the probe 4 and a measuring unit 32 for measuring a surface texture and the like of the object 9 based on the results of the measurement by the probe sensor 44 and the scale sensor 51.

The drive controller 31 outputs to the drive unit 43 and the drive mechanism 5 a position command for driving the stylus 41 and the probe 4 based on a profile data of the object 9 that is input in advance.

The measuring unit 32 includes a first measuring unit 321 and a second measuring unit 322.

The first measuring unit 321 measures the displacement of the stylus 41 (i.e. the displacement of the measurement piece 41A) driven by the drive unit 43 based on the detection results of the probe sensor 44.

The second measuring unit 322 measures the displacement of the probe 4 driven by the drive mechanism 5 based on the detection results of the scale sensor 51. The measurement accuracy of the second measuring unit 322 is lower than that of the first measuring unit 321.

A process for measuring diameters of the holes 91 to 93 on the object 9 and pitches between the holes with the use of the coordinate measuring machine 1 will be described below.

For instance, when the diameter of the hole 92 is to be measured, the drive mechanism 5 moves the probe 4 to a position adjacent to the hole 92 as shown in FIG. 2 under the control of the drive controller 31, where the second measuring unit 322 measures the displacement of the probe 4.

When the displacement of the probe 4 is measured by the second measuring unit 322, under the control of the drive controller 31, the drive unit 43 moves the stylus 41 to bring the measurement piece 41A into contact with an inner circumference of the hole 92 and the first measuring unit 321 measures the displacement of the measurement piece 41A.

When the displacement of the measurement piece 41A is measured by the first measuring unit 321, the measuring unit 32 measures the position of the inner circumference of the hole 92 at which the measurement piece 41A is in contact based on the displacement of the probe 4 and the displacement of the measurement piece 41A.

Then, the measuring unit 32 measures the center and diameter of the hole 92 while moving the measurement piece 41A along the inner circumference of the hole 92 by the drive unit 43.

When the diameter of the hole 93 next to the hole 92 is to be measured, the drive mechanism 5 moves the probe 4 to a position adjacent to the hole 93 under the control of the drive controller 31. Subsequently, the measuring unit 32 measures the center and the diameter of the hole 93 in the same manner as in measuring the hole 92 and measures the pitch between the hole 92 and the hole 93 based on the measured centers and the diameters of the holes 92 and 93.

The coordinate measuring machine 1 according to the exemplary embodiment provides the following advantages.

(1) The coordinate measuring machine 1 measures the holes 91 to 93 by the measurement piece 41A driven by the drive unit 43 and measures the pitch of the holes 91 to 93 by the probe 4 driven by the drive mechanism 5. Since the measurement accuracy by the second measuring unit 322 for measuring the displacement of the probe 4 is lower than the measurement accuracy of the first measuring unit 321 for measuring the displacement of the measurement piece 41A, the large object 9 having a mixture of small areas (e.g. holes 91 to 93 that have to be measured with high accuracy) and large areas (e.g. pitches between the holes 91 to 93 that require not so much of accuracy) can be appropriately measured.

(2) Since only the improvement in measurement accuracy of the first measuring unit 321 is required, the coordinate machine 1 can be inexpensively manufactured.

(3) Since the drive unit 43 is provided on the probe 4 driven by the drive mechanism 5, the size of the drive unit 43 can be reduced as compared to the drive mechanism 5. Accordingly, a small area can be measured at a high speed.

Modifications

It should be understood that the scope of the invention is not limited to the exemplary embodiment, but includes modifications and improvements as long as they are compatible with an object of the invention.

For instance, though the drive mechanism 5 drives the probe 4 in one-axis direction (i.e. X-axis direction) in the exemplary embodiment, the drive mechanism 5 may drive the probe 4 in two-axis directions or in three-axis directions. The drive mechanism may not linearly move the probe but may nonlinearly move the probe with the use of, for instance, a robot arm. In sum, any mechanism may be used for the drive mechanism as long as the drive mechanism supports and drives the probe.

Though the coordinate measuring machine 1 has a single probe 4 in the exemplary embodiment, two or more probes may be provided on the coordinate measuring machine 1.

Though the probe 4 is supported by the drive mechanism 5 so that the axis of the stylus 41 is aligned with Z-axis direction in the exemplary embodiment, the probe may be supported by the drive mechanism in any posture.

The coordinate measuring machine 1 according to the exemplary embodiment has the measurement piece 41A that is brought into contact with the object 9 to measure the object 9. However, the measurement piece provided on the coordinate measuring machine may be a non-contact one such as an imaging probe that is adapted to measure an object without being brought into contact with the object.

What is claimed is:

1. A coordinate measuring machine, comprising:
a probe including a stylus whose tip end is provided with a measurement piece that is movable within a predetermined range; and
a drive mechanism that supports and drives the probe, the coordinate measuring machine measuring an object based on a displacement of the measurement piece and a displacement of the probe, wherein
the probe further includes a measurement-piece drive unit that drives the stylus in axis directions to drive the measurement piece;

the coordinate measuring machine includes:
- a drive controller that outputs a position command for driving the stylus and the probe to the measurement-piece drive unit and the drive mechanism;
- a first measuring unit that measures the displacement of the measurement piece in each of the axis directions after the measurement piece is driven by the measurement-piece drive unit;
- a second measuring unit that measures the displacement of the probe;
- a measurement accuracy of the second measuring unit is lower than a measurement accuracy of the first measuring unit; and,
- when a measurement area of the object is divided in two areas including a small area and a large area, the drive controller outputs the position command for driving the measurement-piece drive unit when the small area is measured and outputs the position command for driving the drive unit when the large area is measured.

* * * * *